United States Patent [19]

Miller

[11] Patent Number: 4,637,307

[45] Date of Patent: Jan. 20, 1987

[54] AUTOMATIC MECHANICAL RESONANT FREQUENCY DETECTOR AND DRIVER FOR SHUTTLE PRINTER MECHANISM

[75] Inventor: Donald E. Miller, Waynesboro, Va.

[73] Assignee: Genicom Corporation, Waynesboro, Va.

[21] Appl. No.: 531,648

[22] Filed: Sep. 13, 1983

[51] Int. Cl.[4] .............................................. B41J 3/02
[52] U.S. Cl. ................................. 101/93.04; 400/124
[58] Field of Search .......................... 101/93.04, 93.05;
400/124, 290, 317.1, 320, 322, 323, 328, 903;
310/12, 13, 14, 27; 318/114, 126, 127, 128, 129, 130, 135, 687

[56] References Cited

U.S. PATENT DOCUMENTS

| | | | |
|---|---|---|---|
| 3,748,553 | 7/1973 | Reiner | 310/27 X |
| 3,872,333 | 3/1975 | Imbert et al. | 310/27 |
| 3,958,166 | 5/1976 | Bailey et al. | 318/135 X |
| 4,049,997 | 9/1977 | McGhee | 318/128 |
| 4,116,567 | 9/1978 | San Pietro | 101/93.05 X |
| 4,180,766 | 12/1979 | Matula | 101/93.04 X |
| 4,227,455 | 10/1980 | Pennebaker | 101/93.04 X |
| 4,247,794 | 1/1981 | Jooss et al. | 310/13 |
| 4,306,497 | 12/1981 | Hamada | 400/124 X |
| 4,332,492 | 6/1982 | Thern et al. | 400/322 X |
| 4,359,289 | 11/1982 | Barrus et al. | 101/93.04 X |
| 4,381,478 | 4/1983 | Saijo et al. | 318/687 |
| 4,395,665 | 7/1983 | Buchas | 318/127 X |
| 4,403,176 | 9/1983 | Cranston | 318/114 |
| 4,415,286 | 11/1983 | Jennings | 101/93.04 X |
| 4,461,984 | 7/1984 | Whitaker et al. | 400/903 X |
| 4,463,300 | 7/1984 | Wayne et al. | 318/217 |

FOREIGN PATENT DOCUMENTS

| | | |
|---|---|---|
| 1410038 | 10/1975 | United Kingdom . |
| 2008809 | 6/1979 | United Kingdom . |
| 2035729 | 6/1980 | United Kingdom . |
| 2063596 | 6/1981 | United Kingdom . |

OTHER PUBLICATIONS

Hewlett-Packard Journal, Nov. 1978, "Optimizing the Performance of an Electromechanical Print Mechanism", Baily et al., pp. 23–31.

Primary Examiner—Ernest T. Wright, Jr.
Attorney, Agent, or Firm—Nixon & Vanderhye

[57] ABSTRACT

The detected phase difference between a sensed motion velocity signal and an electric motor driving signal is used to drive a phase-locked loop which automatically generates a sinusoidal reference signal having a frequency substantially equal to the instantaneous natural mechanical resonant frequency of the driven mechanism. The sinusoidal reference signal is then combined with the sensed velocity feedback signal to generate the motor driving signal required to maintian resonant driving conditions. Low frequency compensation is also provided in the velocity control loop. The sinusoidal velocity reference signal is initially generated in digital form by counting clock signals which are caused to occur at a rate corresponding to the desired frequency of the sinusoidal reference signal.

25 Claims, 3 Drawing Figures

AUTOMATIC MECHANICAL RESONANT FREQUENCY DETECTOR AND DRIVER FOR SHUTTLE PRINTER MECHANISM

SPECIFICATION

This invention is generally directed to a control system for automatically driving a motor driven mechanism (such as a shuttle printer mechanism) to conform to a predetermined motion pattern at a frequency corresponding to its natural mechanically resonant frequency which can be expected to change during operation with changing ambient conditions such as printing activity, temperature, aging of components, etcetera. It is more particularly directed to a shuttle printer having a phase-locked loop control system of this type to automatically maintain the drive input to the driving electrical motor at the natural mechanical resonant frequency of the shuttle mechanism to a desired regulated magnitude and predetermined motion pattern.

Shuttle dot matrix type printer apparatus is already known in the art. For example, a related commonly assigned copending application of Caulier et al. Ser. No. 438,928 filed Nov. 3, 1982 (GE Docket No. 45-SL-01371), now abandoned describes a balanced print head drive mechanism for such a shuttle printer. The contents of this earlier related application are hereby expressly incorporated by reference.

Such earlier shuttle printers also contemplate a closed velocity loop motor control system using a velocity sensor and they contemplate driving the system at the natural mechanism resonant frequency of the shuttle printer mechanism.

However, the instantaneous natural mechanical resonant frequency of the driven print mechanism can be expected to change from unit-tounit and during operation. Such changes may occur for many reasons such as production variation in mass and spring gradient, printing activity at a given time, density of printing at a particular time, paper loading effects, temperature changes, aging in the spring support mechanism of the moving shuttle and/or similar changes in the ambient conditions with which the moving shuttle mechanism must interface.

Minimum consumption of driving power can be expected at the resonant frequency. However, because the resonant frequency changes, prior art techniques of driving the mechanism at a substantially constant frequency will necessarily result in increased driving power requirements and/or motion inaccuracies due to attempts to drive the shuttle mechanism at other than its actual instantaneous resonant mechanical frequency.

Now, however, I have discovered novel apparatus and method which permits automatic detection of the instantaneous resonant mechanical frequency of the driven mechanism and the automatic generation of a driving motor signal having such resonant frequency and also having a regulated amplitude so as to minimize the drive power requirements for a shuttle printer. The invention may also have application as a phase-locked loop control system for automatically driving other types of mechanisms at their natural mechanically resonant driving frequencies.

In brief summary, this invention provides apparatus and method for driving the linear motor of a shuttle printer (which motor may be an integral part of the moving mechanism) so as to control the shuttle print head velocity to be a nearly perfect sinusoid of predetermined and regulated amplitude—despite expected load variations which occur during the printing process. Because a sinusoidal velocity is maintained, the physical displacement of the shuttle mechanism will also be described by a sinusoid as should be appreciated by those skilled in the art. The frequency of such sinusoidal motion is automatically regulated to approximate the natural resonant frequency of the shuttle mechanism despite changes in that resonant frequency caused by variations in mass, spring gradients, or other interfacing ambient conditions associated with the shuttle mechanism during its normal operation.

As a result of such frequency regulation, the shuttle mechanism is driven with a minimum of power (e.g. 5 watts in one exemplary unit) compared to the driving power requirements of similar previous shuttle printer mechanisms (e.g. several hundred watts).

In the presently preferred exemplary embodiment, the motor drive signal is compared to a sensed velocity signal with respect to phase. Any detected phase difference generates an error signal having a magnitude and polarity used to control a voltage controlled oscillator which, in turn, controls the frequency of a sinusoidal reference signal generator output. This sinusoidal reference signal (which is also of controlled magnitude) is then combined with the sensed velocity signal to produce the motor driving signal thus completing an overall phase locked loop type of control circuit.

In some respects the exemplary embodiment can be viewed as a velocity servo-control loop integrally linked to a phase-locked loop oscillator.

In the exemplary embodiment, the output of the voltage controlled oscillator is utilized as a clock to drive a digital counter. The cyclic output of the digital counter is, in turn, used to cyclically access address locations in a digital memory device. The resulting succession of addressed outputs from the digital memory device are then processed by a digital-to-analog converter (with respect to a supplied constant reference voltage) so as to provide an analog wave shape corresponding to the succession of digital values. In the exemplary embodiment, the succession of stored and output digital values correspond to equally spaced samples of a sinusoid. Because the counter is clocked by the output of the voltage controlled oscillator, the frequency of the resulting analog sinusoidal output signal from the digital-to-analog converter will be related to the frequency of the clock signals used in this process.

The preferred exemplary embodiment also provides low frequency compensation within the velocity control loop as well as special ripple filtering and integration of the error signal between the phase comparator and the voltage controlled oscillator in the phase-locked loop.

These as well as other objects and advantages of this invention will be better understood by reference to the following detailed description of the presently preferred exemplary embodiment of this invention taken in conjunction with the accompanying drawings, of which:

Figure 1:
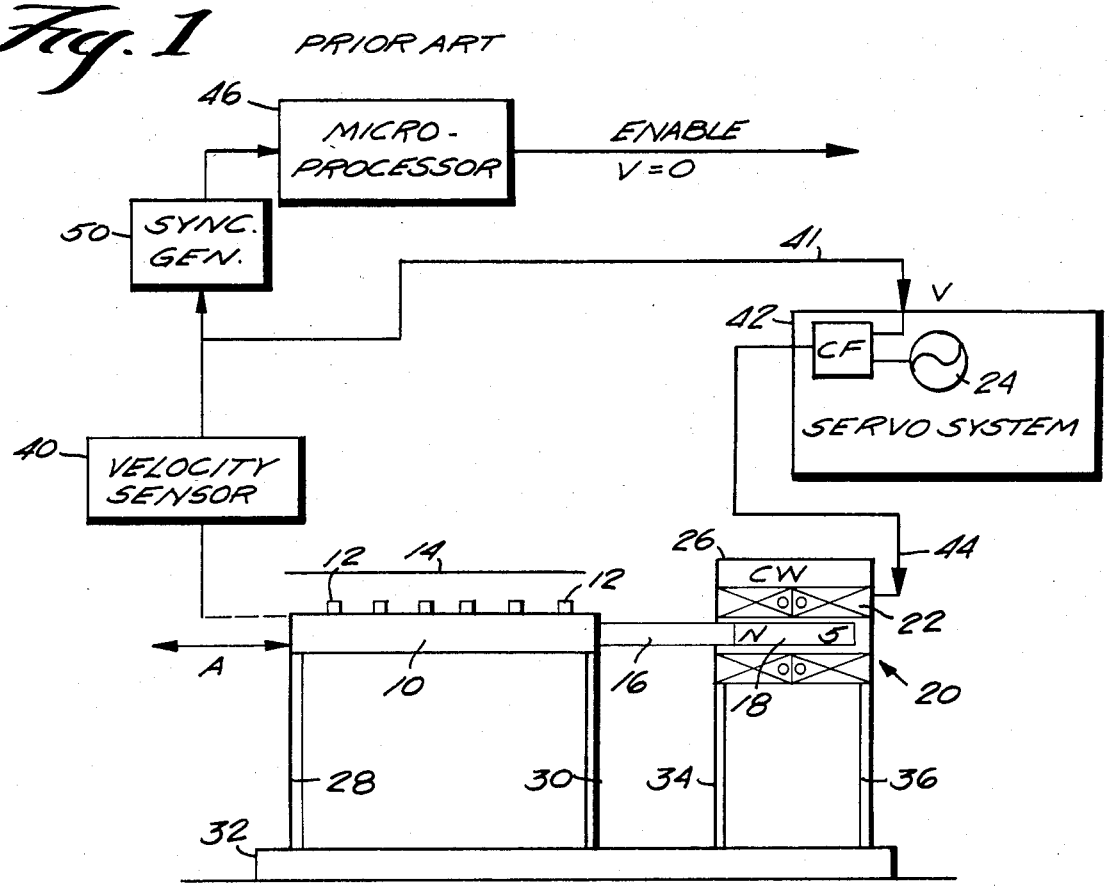
FIG. 1 is a generalized depiction of prior art shuttle printing mechanisms and velocity feedback controlled servo driving systems therefor.

FIG. 1 has been copied from the earlier referenced related copending application and generally illustrates the type of shuttle printer mechanism presently contemplated for improvement by this invention. The shuttle print head 10 typically includes an array of controllable printing elements 12 used to produce a line of print 14 which, typically, may be located on an incrementally driven section of paper. During printing operations, the print head 10 is reciprocated or oscillated back-and-forth in a shuttling manner on leaf springs 28 and 30 in the general directions indicated by arrow A.

In the exemplary embodiment, print head 10 may be fixed to a rod 16 which forms the movable core or armature (e.g. including magnet 18) of a reciprocating linear drive motor 20 which includes a drive coil 22 and which is energized by an alternating current signal 44 having a frequency equal to the resonant frequency of the moving or driven shuttle print mechanism. A counterweight 26 may be fixed to coil 22 to make the total mass of the coil 22 and counterweight 26 approximately equal to that of the reciprocating print mechanism.

The supporting leaf springs 28 and 30 may be fixed to a frame 32 of the printing apparatus. The print head drive coil 22 with its counterweight 26 may also typically be supported on a pair of leaf springs 34 and 36 affixed to frame 32.

In the exemplary embodiment, leaf springs 28, 30, 34 and 36 may be substantially identical and are arranged so as to constrain motion of the print head 10 and coil 22 to roughly equal and oppositely phased linear motion. Although there will of course be a slight displacement of these moving components away from the paper as they move from their quiescent or rest positions, the print head array will remain substantially parallel to the paper at all times as should be apparent from FIG. 1.

Prior art systems such as that depicted in FIG. 1 recognize the desirability of driving the shuttle mechanism at its natural mechanical resonant frequency. However, prior art systems such as that depicted in FIG. 1 inherently assume that this resonant frequency is a fixed predetermined frequency. Thus, a velocity sensor 40 provides a velocity signal on line 41 representative of the actual linear velocity of the shuttle mechanism. This velocity signal is compared in servo system 42 at element CF with a reference signal from an alternating current source 24 of fixed frequency chosen in an attempt to approximate the natural resonant frequency of the shuttle print mechanism. The comparator CF then generates a motor drive signal 44 applied to the motor coils 22. Sync generator 50 may be triggered by a predetermined portion of the velocity signal from sensor 40 so as to, in turn, trigger a microprocessor 46 or the like to enable a print operation to begin.

If the natural resonant mechanical frequency of the shuttle printer remains constant and if that resonant frequency is accurately predetermined and approximately by the ac reference source 24, then minimum driving power would be required from the servo system 42. However, as earlier explained, in actual practice the natural resonant mechanical frequency of the shuttle printer can be expected to change for various reasons from unit-to-unit and during normal operation. As a result, significantly more than minimum driving power may in practice be required to drive such a prior art shuttle printer.

Figure 2:
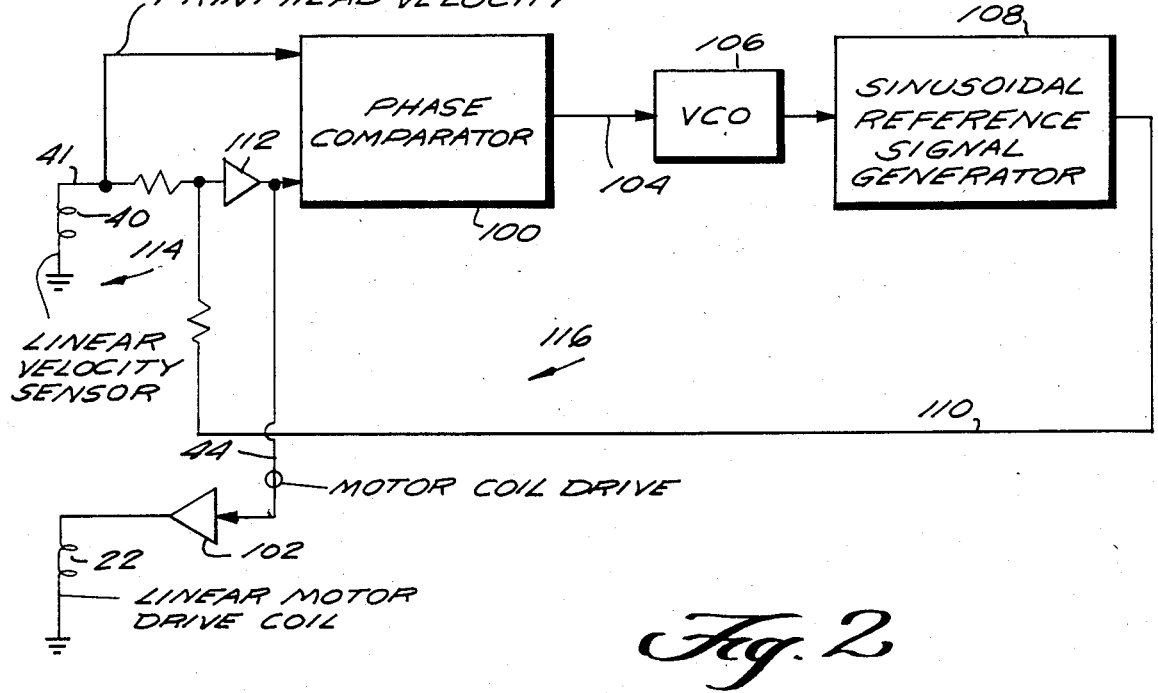
FIG. 2 is a general block diagram of the improved resonant frequency controlled velocity feedback servo system of this invention.

The exemplary embodiment of this invention depicted at FIG. 2 provides a phase-locked loop/velocity loop servo system that may be utilized in lieu of the fixed frequency servo system 42 shown in the shuttle printer of FIG. 1. Here, the same linear velocity sensor 40 may be utilized to generate a velocity signal on line 41. By other means yet to be described, a motor drive signal 44 is also generated and input to the same motor drive coil 22. However, as depicted in FIG. 2, a phase comparator 100 is provided to compare the phase of the sensed velocity signal on line 41 with the phase of the motor coil drive signal 44 (e.g. prior to its power amplification at amplifer 102).

Any detected phase difference between these two compared signals will produce a phase error signal at the output 104 of the phase comparator 100. The phase error signal is then used to drive a voltage controlled oscillator (e.g. a VCO) 106. While a sinusoidal output from such a voltage controlled oscillator 106 might (if the design parameters are properly chosen) directly provide a sinusoidal reference signal of controlled frequency and magnitude, the preferred exemplary embodiment includes a separate sinusoidal reference signal generator 108 which is controlled by the output from the voltage controlled oscillator 106 to produce a sinusoidal reference signal of a controlled frequency and magnitude at its output line 110. This sinusoidal reference signal is then combined with the sensed velocity feedback signal at amplifier 112 (configured with conventional feedback components so as to operate as an integrator) to generate the motor coil drive signal 44 earlier mentioned.

As may now be appreciated, the overall control system of FIG. 2 defines a velocity feedback control loop 114 which is, in turn, partially included within a phase-locked loop 116. The result is an overall phase-locked loop servo control system which automatically (1) detects the natural resonant mechanical frequency of the driven shuttle print mechanism (for reasons to be discussed in more detail below) and (2) automatically maintains the motor coil drive signal at such a detected resonant mechanical frequency and at a controlled or regulated magnitude.

Figure 3:
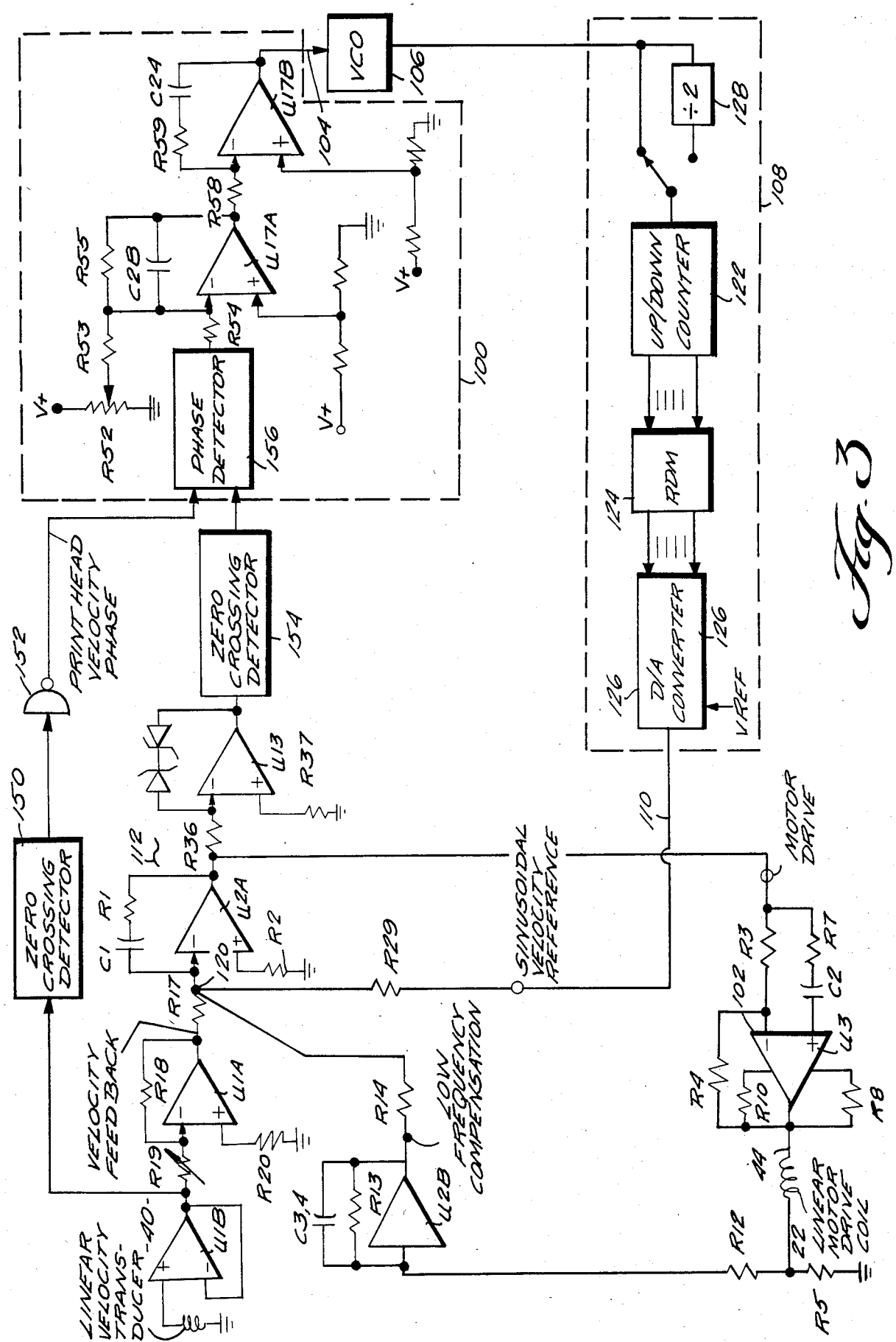
FIG. 3 is a more detailed schematic diagram of the system depicted at FIG. 2.

The exemplary embodiment generally depicted at FIG. 2 is depicted in more detail at FIG. 3 where like reference numerals are used to depict like elements.

The velocity control loop 114 in the exemplary embodiment of FIG. 3 includes operational amplifiers U1A, U1B, U2A, U3 and their associated passive components.

U1B is a buffer amplifier (e.g. a voltage follower) used to prevent loading of the linear velocity transducer (LVT) 40. U1A, R18, R19 and R20 comprise a voltage gain amplifier used to provide feedback amplification and the necessary loop gain for the velocity loop 114. U2A, R1, C1, R2, R17, R29 and R14 including summing node 120 provide means for algebraically summing the velocity feedback signal (i.e. the output of amplifier U1A) with the sinusoidal reference signal (i.e. the output of sinusoidal reference signal generator 108).

A low frequency compensation feedback (i.e. internal current loop) from amplifier U2B is also combined at summing node 120 in the exemplary embodiment.

U3, R4 and R3 provide power amplification for the motor drive signal with a small voltage gain. R7 and C2 help ensure stability of amplifier U3 while current limiting resistors R8 and R10 limit the maximum output current from the power amplifier U3. As depicted in FIG. 3, the output of amplifier U3 drives the linear motor drive coil 22.

Amplifier U2A is configured with conventional feedback components C1, R1 as an integrator and connected to integrate the error signal represented by the summed voltage at node 120 (e.g. the algebraic sum of the sinusoidal reference and velocity feedback signal). Accordingly, the output from amplifier U2A represents the integrated error detected in the velocity control loop 114.

Without the low frequency compensation circuit comprising amplifier U2B, the velocity loop 114 may have a nearly zero low frequency gain. If so, this characteristic may cause the output of integrator U2A to drift and ultimately go toward one of its limits and make the loop inoperable. Accordingly, the preferred exemplary embodiment includes a relatively slow current regulator implemented by a current sensing resistor R5 together with amplifier U2B and its associated components. R12, R13 and R14 provide an acceptable low frequency compensation current loop gain while components R13, C3 and C4 provide a phase lead/lag frequency current loop compensation. In this regard, it should be noted that there is no identifiable current reference depicted since the desired time average current in the linear motor coil 22 is zero.

If the shuttle print head 10 is to move sinusoidally, then a sinusoidal reference signal must be presented on line 110. In the exemplary embodiment of FIG. 3, a sinusoidal reference voltage is generated by up/down counter 122, a read only memory (ROM) 124 and a digital-to-analog converter 126. A stable reference voltage is also supplied to the digital-to-analog converter 126 as depicted in FIG. 3 so as to scale its analog output accordingly and thus regulate the magnitude of the sinusoidal reference signal.

In the exemplary embodiment, counter 122 continuously counts up and down from zero to 511 (or some predetermined number) and then from 511 back to zero. Thus, the up/down cyclic counter 122 continuously provides a succession of changing cyclic digital address signals to ROM 124 as depicted in FIG. 3. Since the counter 122 increments (or decrements) its contents at time intervals determined by an input clock signal (the generation of which will be later discussed), it follows that the succession of digital address signals provided to ROM 124 change at time intervals determined by the input clock signal. The ROM 124 has contents which are "programmed" to provide output digital data bytes which closely approximate the magnitude of a sinusoid at equally spaced sampling points in response to the cyclic sequence of input digital address signals. As will be appreciated, other types of cyclic counters or the like may be employed to generate cyclic address signals to ROM 124. For example, a continuously up counting counter (which "turns over" to start another up counting cycle) might be used if more ROM storage is provided to store digital samples representing a complete cycle of the sinusoid or the like.

The digital signals representing a sampled sinusoid are then successively input to a digital-to-analog converter 126 which is thereby caused to output a continuous nearly sinusoidal voltage. Since a reference voltage is employed by the digital-to-analog converter 126, the amplitude of the continuous sinusoidal reference signal is thus precisely controlled and regulated. As will be appreciated by those skilled in the art, such counters, ROMs and digital-to-analog converters with reference voltage inputs are in themselves of conventional design and commercially available.

It should now be appreciated that the frequency of the sinusoidal voltage reference signal on line 110 is determined by the frequency of the clock input driving counter 122. In the exemplary embodiment, there are approximately 1,020 digital sample signals required to determine a complete cycle of the sinusoid. Accordingly, in this embodiment, the sinusoidal reference signal frequency is equal to the input clock signal divided by 1,020. A further frequency divider 128 may be provided so as to make the system easily adapted (e.g. by switch connection) for driving different shuttle printer mechanisms designed to operate at different average printing speeds.

A shuttle printer mechanism principally exhibits a second order under damped impulse response characteristic. Any such second order system has a peak gain at the resonant frequency which might be sensed for control purposes. However, in the presently preferred exemplary embodiment, it is more important to note the rather drastic phase shift which occurs (from −90° to −90°) as the driving frequency is increased to pass through the mechanically resonant frequency of the print shuttle mechanism. Moreover, near the mechanical resonant frequency, the relative phase shift between the sensed velocity and the driving signal is nearly 0°.

In the exemplary embodiment, this relative phase information is simultaneously used to detect the resonant frequency and to automatically generate a sinusoidal velocity reference signal at that resonant frequency. This is the function of the linked phase-locked loop 116 to regulate the phase angle between the motor coil drive voltage and the sensed print head velocity signal to approximately 0° by appropriately changing the sinusoidal velocity reference signal frequency on line 110 used in the velocity control loop 114.

However, before such phase regulation can be realized, signals representing the motor drive voltage phase and the sensed velocity phase must be derived in a form which can be easily used by the phase detector 100. For the sensed velocity analog signal, an appropriate signal conversion is performed by a conventional zero crossing detector 150. The output of zero crossing detector 150 is inverted at inverter 152 and input to one of the phase detection inputs of phase detector 100 as depicted in FIG. 3.

The motor drive voltage appearing at the output of amplifier/integrator 112 is converted to a square wave by amplifier U13 and its associated passive components (including input resistors R36 and R37) and the resulting signal is then processed by another zero crossing detector 154 to provide the second input to phase detector 100 representative of the motor driving voltage phase.

The detected phase difference (phase regulator error) between the motor coil voltage and the print head sensed velocity is indicated by the time average value of the output voltage from phase detector 156. This voltage is preferably filtered by amplifier U17A (having conventional input resistor R54 and feedback components R55, C28) and integrated and phase compensated by amplifier U17B and associated components (including a conventional input resistor R58 and feedback components R59, C24) so as to develop a filtered integrated error voltage at line 104 to drive the VCO 106. Such filtering is often done with a single passive first order lag filter. However, those skilled in the art of servo mechanisms will appreciate that a phase-locked loop should have two poles in its open loop gain so as to drive the steady state detected phase error to zero. One of such poles is provided inherently by the VCO 106. The other is in the exemplary embodiment provided externally thereof (i.e. amplifier U17B and its associated passive components R58, R59, C24).

Amplifier U17A and its associated components provide loop gain, a first order lag filter and phase regulator error summation. For example, a phase regulator error reference voltage is provided by resistors R52 and R53. Amplifier U17B and its associated components R58, R59, C24 provide loop gain, an integrator (the required extra pole) and phase lead frequency compensation for loop stability. The output voltage from amplifier U17B then drives VCO 106 which, in turn, provides the clock signal required to drive the up/down counter 122.

In the exemplary embodiment, the frequency of the sinusoidal velocity reference signal on line 110 is equal to the clock signal divided by 1,020. Since the output frequency of the VCO 106 determines the frequency of the sinusoidal velocity reference signal on line 110, this provides a means for changing the phase error in the phase regulator as required to maintain a near zero phase error at the output of detector 156. In so doing, it will automatically drive the print shuttle mechanism at its natural mechanical resonant frequency—despite changes in that frequency which may be caused during its operation by changes in mass or spring constants or other ambient operating conditions. Accordingly, the overall phase-locked loop/velocity loop servo control system of FIG. 3 automatically controls the driving frequency of the motor and ensures minimum driving power requirements.

Although only one exemplary embodiment of this invention has been described in detail above, those skilled in the art will appreciate that there are many possible variations and modifications which may be made in the exemplary embodiment while yet retaining many of the novel features and advantages of the invention. Accordingly, all such modifications and variations are intended to be included within the scope of the following claims.

What is claimed is:

1. A shuttle printer comprising:
an electrically driven shuttle print mechanism having a varying instantaneous mechanical resonant frequency for its shuttling movement;
control means coupled to said mechanism for deriving a reference signal representative of the instantaneous value of said mechanical resonant frequency including motion sensor means for detecting the instantaneous motion of said mechanism; and
electrical motor driving circuit means responsive to said reference signal and to said detected instantaneous motion for driving said mechanism in synchromesh with its derived instantaneous mechanical resonant frequency while also conforming to a predetermined motion pattern.

2. A shuttle printer as in claim 1 wherein:
said motion sensor means detects the instantaneous velocity of the mechanism and provides an electrical velocity signal representative thereof;
said electrical motor driving circuit means generates an electrical drive signal having said predetermined motion pattern to drive the mechanism as a function of at least (1) said velocity signal and (2) said reference signal; and
said control means also includes electrical signal comparison means connected to compare said velocity signal and said drive signal and to generate said reference signal having a frequency substantially equal to said instantaneous mechanical resonant frequency.

3. A shuttle printer as in claim 2 wherein said electrical signal comparison means comprises a phase comparator driving a controlled oscillator in a phase-locked loop which maintains substantially zero phase difference between the compared signals.

4. A shuttle printer as in claim 3 wherein said electrical signal comparison means further comprises:
a digital counter clocked by the output of said controlled oscillator;
a digital signal memory device cyclically addressed by said digital counter to provide digital electrical signals representative of the magnitude of successive equally-spaced samples of a sinusoid; and
a digital-to-analog electrical signal converter driven by said digital signals from the memory device to produce said reference signal.

5. A shuttle printer as in claim 4 further comprising low frequency compensation means connected to provide an additional low frequency compensation control input to said electrical motor driving circuit means.

6. A shuttle printer as in claim 1 wherein said predetermined motion pattern is sinusoidal.

7. A shuttle printer comprising:
a shuttle print mechanism having a natural mechanically resonant frequency of back-and-forth shuttling movement which changes with changing ambient conditions;
linear electrical motor means disposed for mechanically driving said shuttle print mechanism in response to an electrical drive input signal;
linear velocity transducer means disposed for sensing the velocity of said shuttle print mechanism and for producing an electrical velocity signal representative thereof;
means for comparing the phase of said electrical velocity signal to the phase of said electrical drive input signal to detect said mechanically resonant frequency, and means generate a sinusoidal electrical reference signal having a frequency substantially equal to the thus detected mechanically resonant frequency; and
motor drive means connected for generating said electrical drive input signal in response to said reference signal and to said velocity signal.

8. A shuttle printer as in claim 7 wherein said motor drive means includes low frequency compensation means connected to its input from a drive coil of the motor means.

9. A shuttle printer comprising:
a shuttle print mechanism capable of cyclic back-and-forth shuttle movements;
a linear electric motor having an electric coil and being disposed to mechanically drive said mechanism in accordance with an electrical drive signal input to the coil;
a linear velocity transducer disposed to detect the instantaneous velocity of the mechanism and to produce a corresponding electrical velocity feedback signal;

means for combining said velocity feedback signal with a provided electrical velocity reference signal and for generating said drive signal in response thereto;

phase comparator means connected to compare the relative phases of said velocity feedback signal and said drive signal and to generate an error signal representative of any detected phase difference therebetween;

filtering means connected to filter said error signal and to produce a filtered integrated error signal at an output terminal;

a signal controlled electrical oscillator connected to produce a succession of clock signals at a frequency corresponding to said filtered error signal;

a digital counter connected to receive said clock signals and to provide a cyclical succession of digital address signals;

a digital memory connected to be addressed by said address signals and to provide a cyclical succession of digital sinusoid signals representing a sampled sinusoid having a frequency corresponding to the frequency of said clock signal; and a digial-to-analog signal converter connected to receive said digital sinusoid signals and to provide a corresponding analog sinusoidal output to said means for combining as said provided electrical velocity reference signal.

10. A phase-locked control system for driving an electric motor driven mechanism at its natural mechanically resonant driving frequency, said system comprising:

velocity sensor means for sensing the instantaneous velocity of the mechanism and producing a corresponding velocity signal;

electric motor driven means for driving said mechanism in response to a supplied drive signal;

phase comparison means connected to compare the phases of said velocity signal and said drive signal and to produce an error signal representative of such comparison;

a frequency controlled sinusoidal reference signal generating means for generating a sinusoidal reference signal having a frequency corresponding to said error signal; and drive signal generating means for generating said drive signal in response to said sinusoidal reference signal and said velocity signal.

11. A phase-locked control system as in claim 10 further comprising low frequency compensation means connected to provide a low frequency compensation input to said drive signal generating means in response to detected low frequency current flowing through said electric motor driven means.

12. A resonantly driven shuttle printer mechanism comprising:

an electrically driven shuttle printer mechanism;

a servo control loop including a motion sensor means for sensing motion of said printer mechanism and also including electrical drive circuits connected to electrically drive said mechanism in a repetitive shuttling motion which conforms to a predetermined motion pattern; and a phase-locked loop oscillator means electrically linked to said servo control loop so as to receive two input signals from said servo control loop (a) to detect the currently existing natural resonant frequency of said shuttling mechanism, and (b) to control the frequency at which the servo control loop drives said mechanism so as to match the driven shuttling frequency to the mechanical resonant frequency of the mechanism.

13. A method for electrically driving a shuttle print mechanism having a varying mechanical resonant frequency for its shuttling movements in a repetitive shuttling motion which conforms to a predetermined motion pattern, said method comprising the steps of:

detecting the instantaneous actual motion of said mechanism and phase comparing such detected actual motion with a signal taken from a servo control loop which controls driven mechanism movements to derive a reference signal representative of said mechanical resonant frequency, and driving said servo control loop and therefore said mechanism as its detected mechanical resonant frequency in response to said reference signal.

14. A method for electrically driving a shuttle print mechanism having a varying mechanical resonant frequency for its shuttling movements, said method comprising the steps of:

detecting the instantaneous velocity of said mechanism to derive said mechanical resonant frequency, and driving said mechanism at its detected mechanical resonant frequency, wherein said detecting and driving steps comprise:

detecting the instantaneous velocity of the mechanism and providing an electrical velocity signal representative thereof;

generating a sinusoidal electrical drive signal to the mechanism as a function of at least (1) said velocity signal and (2) an input sinusoidal reference signal; and comparing said velocity signal and said drive signal and generating said sinusoidal reference signal at a frequency substantially equal to said mechanical resonant frequency.

15. A method as in claim 14 wherein said comparison step comprises maintaining substantially zero phase difference between the compared signals.

16. A method for mechanically driving a shuttle print mechanism having a natural mechanically resonant frequency of back-and-forth shuttling movement which changes with changing ambient conditions, said method comprising:

mechanically driving said shuttle print mechanism in response to an electrical drive input signal;

sensing the velocity of said shuttle print mechanism and producing an electrical velocity signal representative thereof;

comparing the phase of said electrical velocity signal to the phase of said electrical drive input signal to detect said mechanically resonant frequency and to generate a sinusoidal electrical reference signal having a frequency substantially equal to the thus detected mechanically resonant frequency; and generating said electrical drive input signal in response to said reference signal and to said velocity signal.

17. A method for driving an electric motor driven mechanism at its natural mechanically resonant driving frequency, said method comprising:

sensing the instantaneous velocity of the mechanism and producing a corresponding velocity signal;

driving said mechanism in response to a supplied drive signal;

comparing the phases of said velocity signal and said drive signal and producing an error signal representative of such comparison;

generating a sinusoidal reference signal having a frequency corresponding to said error signal; and generating said drive signal in response to said sinusoidal reference signal and said velocity signal.

18. A shuttle printer comprising:
a shuttle print mechanism having a natural mechanically resonant frequency of back-and-forth shuttling movement,
means responsive to a drive signal for driving said shuttle print mechanism,
means responsive to the movement of said shuttle print mechanism for producing a first signal representative thereof,
a source of a reference signal having a given period wave shape,
means for combining said reference signal and said first signal to provide said drive signal,
means responsive to the phase of said reference signal and the phase of said first signal to provide a control signal, and
means to modify the periodicity of said reference signal to match that of said natural mechanically resonant frequency in response to said control signal.

19. A shuttle printer according to claim 18 wherein said means to modify continuously modifies the periodicity of said reference signal during each period of said reference signal.

20. A shuttle printer comprising the combination of:
a shuttle print mechanism and means for driving said mechanism, said print mechanism and said means for driving having a mechanical resonant frequency during shuttling movement which is subject to change,
said means for driving being responsive to an applied drive signal for driving said mechanism at substantially said resonant frequency during such change and comprising (a) means coupled to said print mechanism for providing a first signal which varies as a function of the movement of said print mechanism, (b) a source of a reference signal having a given periodic wave shape, (c) means for comparing the instantaneous values of said reference signal to said first signal to provide a source of said applied drive signal, (d) means for comparing a characteristic of said reference signal to a characteristic of said first signal to provide an error signal, and (e) means responsive to said error signal to modify the periodicity of said reference signal as a function of said natural mechanical resonant frequency.

21. A shuttle printer comprising:
a printer assembly suspended by flexible members for reciprocating shuttling movements along a print line, said assembly having a natural resonant mechanical frequency for such shuttling movements which is variable;
an electromechanical drive motor coupled to impart reciprocating mechanical shuttling motion to said assembly in response to an applied electrical drive input;
an electromechanical motion sensor coupled to sense actual movements of said assembly and to provide an electrical motion signal corresponding thereto;
an electrical drive circuit coupled to said motion sensor and to said drive motor for supplying said electrical drive input in response to a supplied electrical reference signal so as to maintain actual assembly movements in correspondence with said reference signal; and
resonance frequency detecting means electromechanically coupled to said assembly for detecting its current natural resonant mechanical frequency and for supplying said reference signal having a frequency controlled to substantially equal said detected natural resonant mechanical frequency.

22. A shuttle printer as in claim 21 wherein said resonance frequency detecting means comprises a phase locked loop including:
a phase comparator connected to compare the phases of said motion signal and said drive input and to generate a control signal corresponding to the detected phase difference therebetween; and
a controlled sinusoidal signal generator connected to supply, as said reference signal, a sinusoid having a frequency corresponding to said control signal.

23. A shuttle printer as in claim 22 wherein said controlled sinusoidal signal generator comprises:
a voltage controlled oscillator driving a digital counter and a digital-to-analog converter.

24. A shuttle printer comprising:
a printer assembly suspended for oscillatory reciprocating shuttling movements along a print line, said assembly having a natural resonant mechanical frequency for such shuttle movements which resonant frequency varies from unit-to-unit and as a function of encountered ambient conditions;
an electromechanical drive means for mechanically driving said printer assembly in accordance with a predetermined motion pattern of displacement versus time but at a repetition frequency which varies as a function of a supplied electrical reference signal;
a resonant frequency detector means arranged to detect the actual mechanical resonant frequency of said printer assembly and to supply said drive means with an electrical signal representing a frequency synchronized to such measured resonant frequency as said supplied electrical reference signal thereby causing said predetermined motion pattern to be repeated at a frequency which is synchronized with the detected actual mechanical resonant frequency.

25. A method for driving a shuttle printer assembly suspended for oscillatory reciprocating shuttling movements along a print line, said assembly having a natural resonant mechanical frequency for such shuttle movements which resonant frequency varies from unit-to-unit and as a function of encountered ambient conditions and including an electromechanical drive circuit which electromechanically drives the shuttle in accordance with a predetermined motion pattern of displacement versus time but at a repetition frequency which varies as a function of a supplied electrical reference signal, said method comprising the steps of:
measuring the actual mechanical frequency of said printer assembly;
generating an electrical signal representing a frequency synchronized to said measured resonant frequency; and
supplying said generated electrical signal to said electromechanical drive circuit as said reference signal thereby causing said predetermined motion pattern to be repeated at a frequency which is synchronized with the detected actual mechanical resonant frequency.

* * * * *